(12) United States Patent
Richards et al.

(10) Patent No.: US 8,551,304 B2
(45) Date of Patent: *Oct. 8, 2013

(54) ALKALINE ELECTROLYZER

(76) Inventors: William R Richards, Springfield, VA (US); Alan L Volker, Springfield, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,527

(22) Filed: Feb. 23, 2012

(65) Prior Publication Data

US 2012/0152734 A1 Jun. 21, 2012

Related U.S. Application Data

(63) Continuation of application No. 12/457,603, filed on Jun. 16, 2009, now Pat. No. 8,123,915.

(60) Provisional application No. 61/061,939, filed on Jun. 16, 2008.

(51) Int. Cl.
| | |
|---|---|
| *C25B 9/08* | (2006.01) |
| *C25B 9/18* | (2006.01) |
| *C25B 9/20* | (2006.01) |
| *C25B 13/00* | (2006.01) |
| *C25B 1/08* | (2006.01) |
| *C25B 1/10* | (2006.01) |

(52) U.S. Cl.
USPC .......................... 204/253; 204/258; 205/628

(58) Field of Classification Search
None
See application file for complete search history.

(56) References Cited

U.S. PATENT DOCUMENTS

| | | | |
|---|---|---|---|
| 4,317,864 A | 3/1982 | Strasser | |
| 4,357,224 A | 11/1982 | Hardman et al. | |
| 4,369,102 A | 1/1983 | Galluzzo et al. | |
| 5,460,705 A | 10/1995 | Murphy et al. | |
| 5,961,795 A | 10/1999 | Mah et al. | |
| 6,309,521 B1 | 10/2001 | Andrews et al. | |
| 6,315,886 B1 | 11/2001 | Zappi et al. | |
| 6,365,032 B1 | 4/2002 | Shiepe et al. | |
| 6,638,413 B1 | 10/2003 | Weinberg et al. | |
| 6,666,961 B1 | 12/2003 | Skoczylas et al. | |
| 6,787,009 B2 | 9/2004 | Merk et al. | |
| 8,123,915 B2 * | 2/2012 | Richards et al. | 204/252 |
| 2002/0017463 A1 | 2/2002 | Merida-Donis | |
| 2004/0043888 A1 | 3/2004 | Ando et al. | |
| 2007/0286949 A1 | 12/2007 | Doyen et al. | |

OTHER PUBLICATIONS

Sefar, "Precision Woven Synthetic Monofilament Fabrics", no date available.

* cited by examiner

*Primary Examiner* — Harry D Wilkins, III
(74) *Attorney, Agent, or Firm* — Mattingly & Malur, PC

(57) ABSTRACT

An Alkaline Electrolyzer Cell Configuration (AECC) has a hydrogen half cell; an oxygen half cell; a GSM (Gas Separation Membrane); two inner hydrogen half cell spacer screens; an outer hydrogen half cell spacer screen; a hydrogen electrode; two inner oxygen half cell spacer screens; an outer oxygen half cell spacer screen; and an oxygen electrode. The hydrogen half cell includes the hydrogen electrode which is located between said two inner hydrogen half cell spacer screens and said outer hydrogen half cell spacer screen. The oxygen half cell includes the oxygen electrode which is located between said two inner oxygen half cell spacer screens and said outer oxygen half cell spacer screen. The GSM is provided between said two inner hydrogen half cell spacer screens of the hydrogen half cell and said two inner oxygen half cell spacer screens of the oxygen half cell to from the electrolyzer.

7 Claims, 9 Drawing Sheets

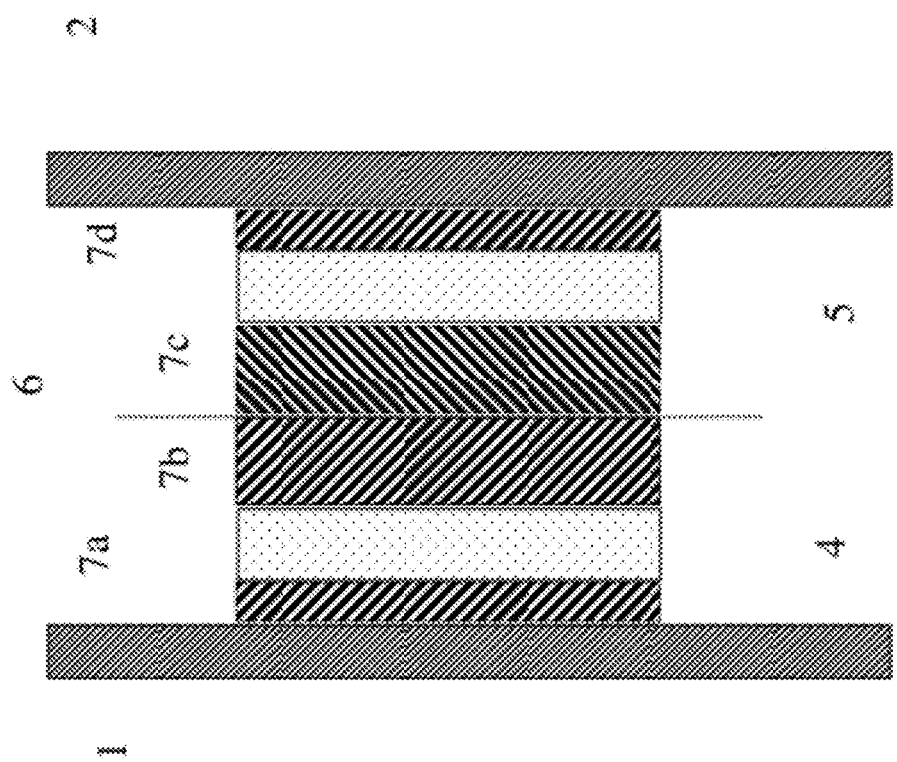

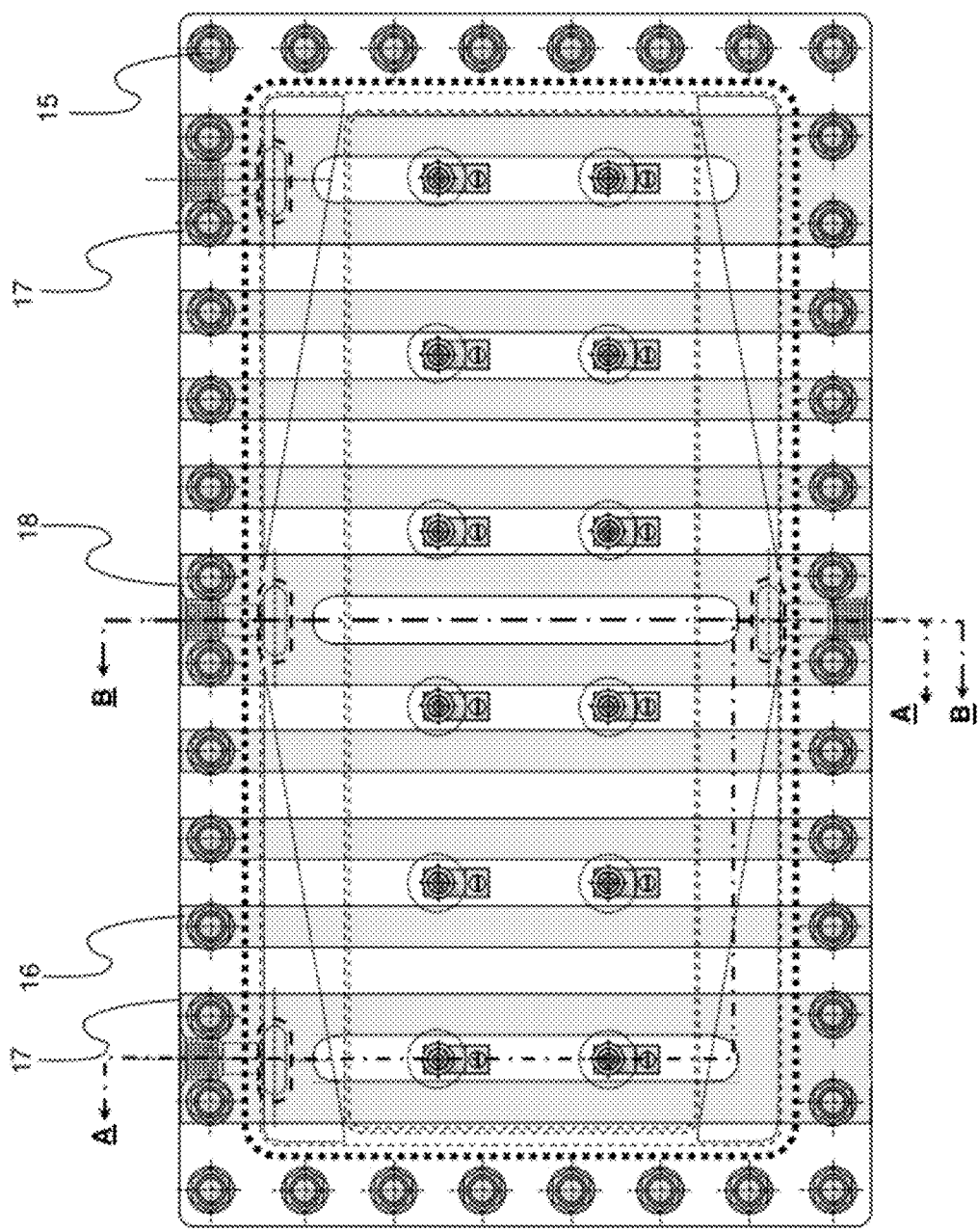

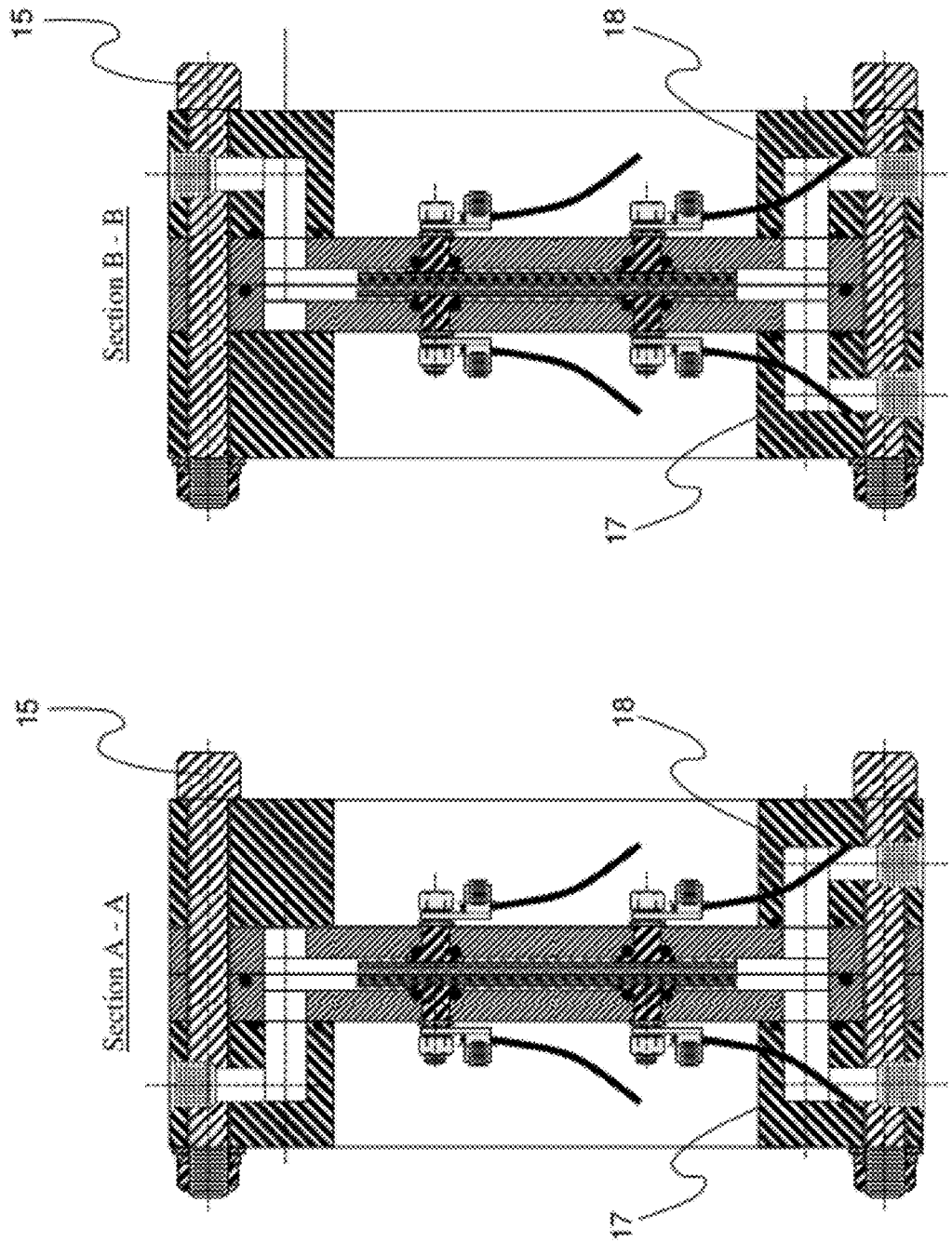

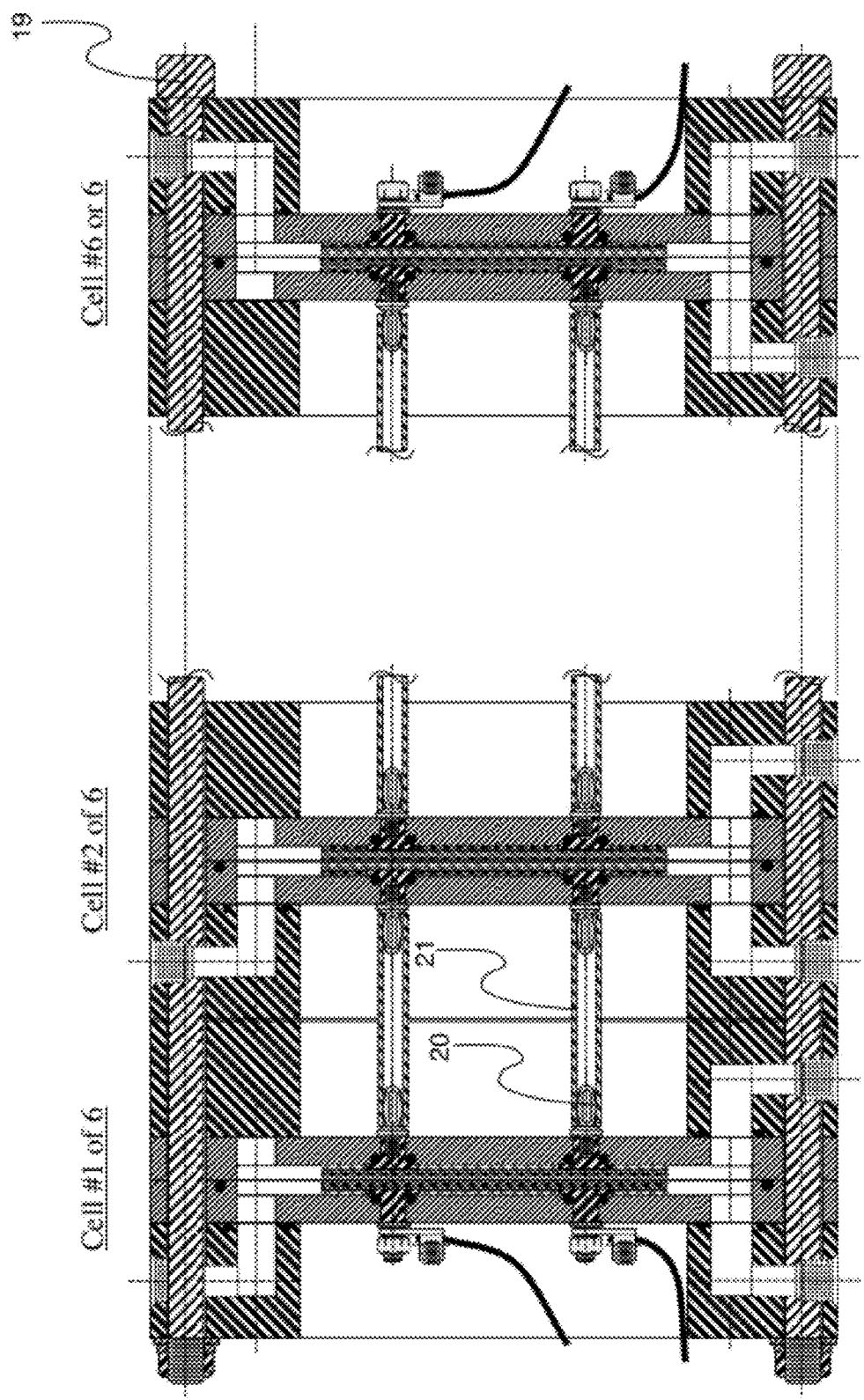

ALKALINE ELECTROLYZER

CROSS REFERENCES TO RELATED APPLICATIONS

This application is a continuation of U.S. patent application Ser. No. 12/457,603, filed Jun. 16, 2009, which claims the benefit of U.S. Provisional Application No. 61/061,939, filed Jun. 16, 2008 by the same inventors as herein, the entire disclosure of which is incorporated herein by reference.

BACKGROUND OF THE INVENTION

1. Field of the Invention

The present invention relates generally to an alkaline electrolyzer configuration featuring significantly higher power density, higher efficiency, and higher operating pressure capability at a greatly lower cost versus existing PEM-based electrolyzer configurations.

2. Description of Related Art

Prior art design configurations DO NOT MEET DOE 2012 goals for $/kW ($400/kW), $/gge Hydrogen produced ($2.50/gge), or for efficiency (69%).

OBJECTIVES OF THE INVENTION

Disclosure of methodology to adapt a large active area high power density, high efficiency, very low cost flat panel electrolyzer configuration for pressures up to 200 bar, at costs <$333/kW; $0.96/gge $H_2$ produced, and 81% efficiency. The resultant configuration is intended for use in an extremely affordable very high power density UPS system for residential, commercial, or industrial applications. The resultant H2 and O2 gasses are generated at stored at pressures of up to 200 bar, and are intended for use with high performance PEM fuel cell stacks. Alternatively, the electrolyzer configuration could act as the primary means for low cost/high power density energy storage for renewable energy power generation. In this alternative application, the electrolyzer may be operated as a refueling station for the production and dispensing of very low cost hydrogen fuel for hybrid vehicles, or stored for later use with externally-fired gas turbine generator sets on wind farms, as supplemental or backup power generation when winds are low or nonexistent.

BRIEF DESCRIPTION OF THE DRAWINGS

FIG. 1d is an enlarged, spaced apart view of a portion of the electrode assembly shown in FIG. 1c that shows a stack-up of separator plates with the GSM between fiberglass plates, according to an embodiment of the invention.

FIG. 2 depicts a front elevation view of the assembled single cell configuration, showing tie rod fasteners (15), single width reinforcement bars (16) and triple width manifold/reinforcement bars (17 & 18).

FIG. 3 shows a side elevation section of the assembled electrolyzer cell with the manifolded/reinforcing bars (16, 17 & 18).

FIG. 4 illustrates connection of a group of six or more cells into a larger module, by replacement of the individual tie rods (15) with extended tie rods (19).

DETAILED DESCRIPTION OF THE PREFERRED EMBODIMENTS

Figure 1A:
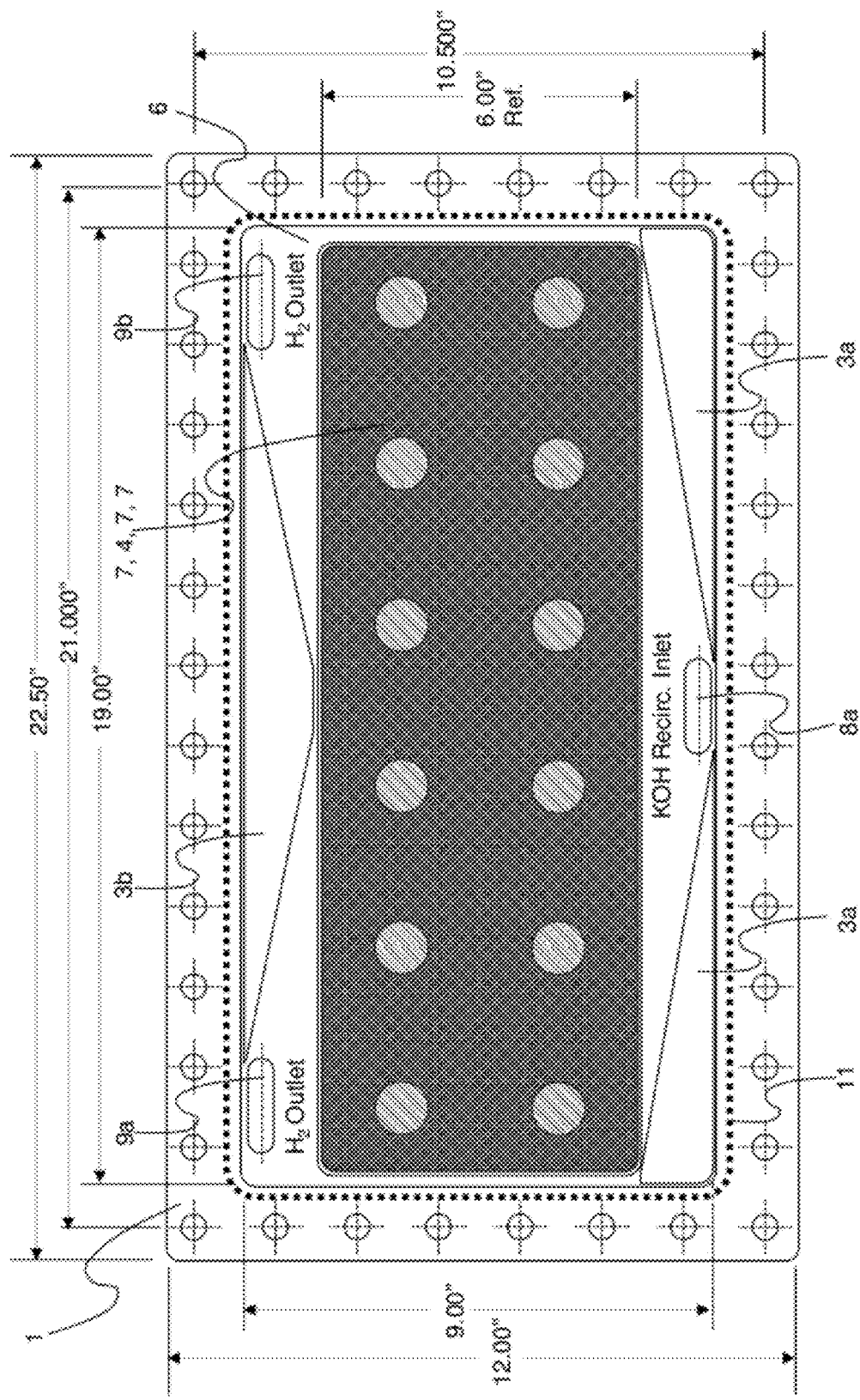
FIG. 1a is a front elevation view of a 108 in² active area alkaline electrolyzer configuration hydrogen half-cell (1).

An Alkaline Electrolyzer Cell Configuration (AECC) is disclosed which achieves high efficiency by use of laminar flow forced recirculation. FIG. 1a is a front elevation view of a 108 in² active area alkaline electrolyzer configuration hydrogen half-cell (1). The hydrogen half-cell (1) plates provides mounting groove features for incorporation of a static face gland O-ring seal (11). Precision 0.125" thickness plastic inserts (3a and 3b) direct the KOH recirculation flow volume from the KOH recirculation inlet (8a) uniformly into the space between the hydrogen electrode (4) and the GSM "picture frame" (6) and the gap generated by two spacer screens (7) located between the exposed GSM "picture frame" (6) surface and the hydrogen electrode (4). Flow is subsequently diverted from the gap area towards dual hydrogen outlets (9a and 9b), using precision 0.125" thickness plastic insert 3b. A third spacer screen (7) is located in back of the hydrogen electrode (4) and provides two rows of 12 each cut-outs to allow connection to a 12-point distributed power feed arrangement. The back spacer screen (7) provides ~$\frac{1}{8}^{th}$ the recirculation flow volume versus that of the doubled spacer screens (7) located on the front face of the electrode, due to laminar flow conditions in the respective square annulus features of each flow passage.

Figure 1B:
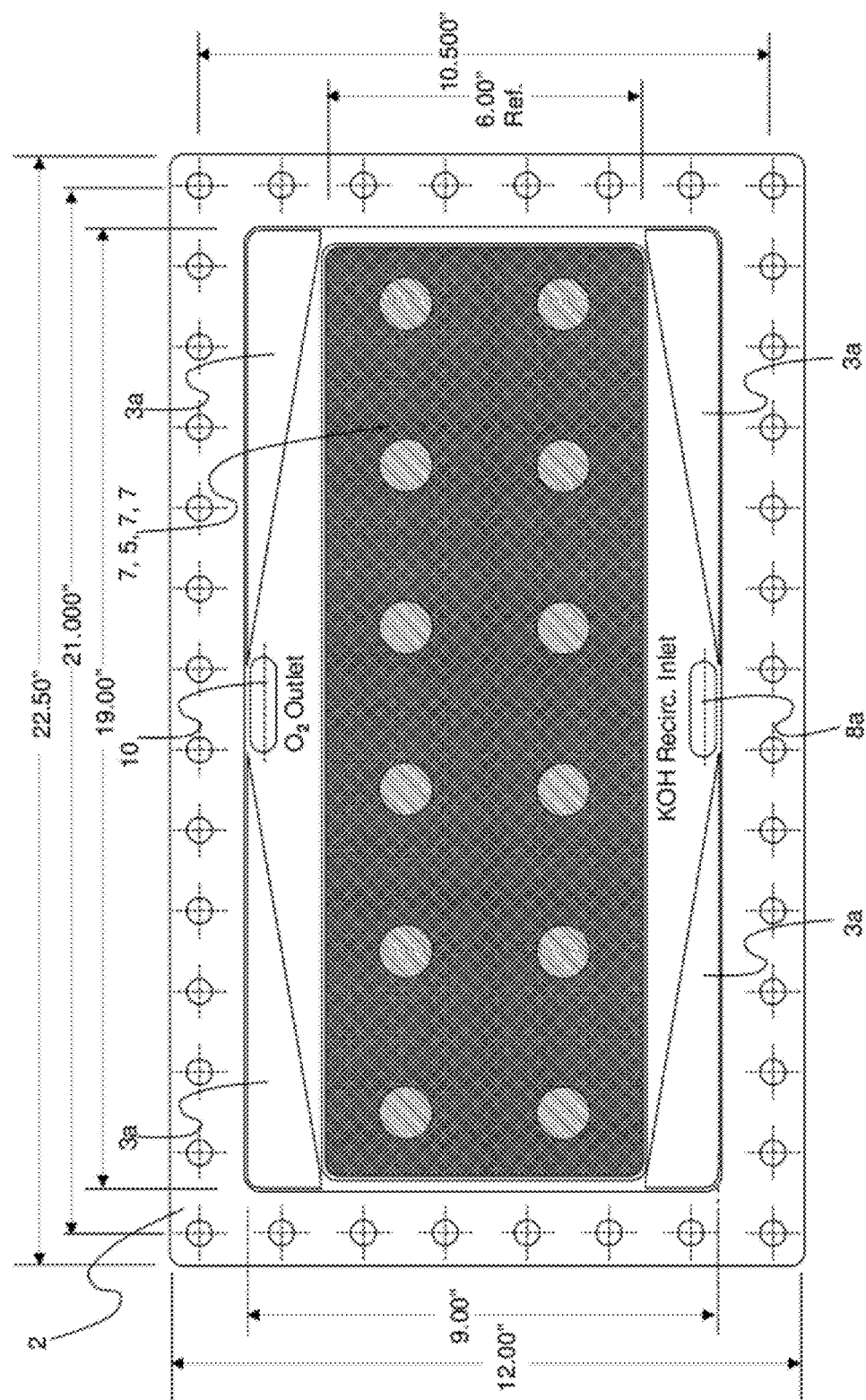
FIG. 1b shows a front elevation view of a 108 in² active area alkaline electrolyzer configuration oxygen half-cell (2).

FIG. 1b shows a front elevation view of a 108 in² active area alkaline electrolyzer configuration oxygen half-cell (2). The oxygen half-cell plate (2) provides a matching smooth face for providing a sealing surface to the static face seal O-ring (11) installed in the mating hydrogen half-cell (1). The plates (1) and (2) are high strength and made of G-10 fiberglass material for example. Precision 0.125" thickness plastic inserts (3a) direct the KOH recirculation flow from the recirculation inlet (8a) uniformly into the space between the oxygen electrode (5), the GSM "picture frame" (6) and the gap generated by two spacer screens (7), located between the exposed GSM "picture frame" (6) surface and the oxygen electrode (5). Flow is subsequently diverted from the gap area towards single oxygen outlets (10) using a precision 0.125" thickness plastic insert (3a). A third spacer screen (7) is located in back of the oxygen electrode (5) and provides two rows of 12 each cutouts, identical to those of the hydrogen half cell, to allow connection to a 12-point distributed power feed. The back spacer screen (7) provides ~$\frac{1}{8}^{th}$ the recirculation flow volume versus that of the doubled spacer screens (7) located on the front face of the electrode, due to laminar flow conditions in the respective square annulus features of each flow passage.

Figure 1C:
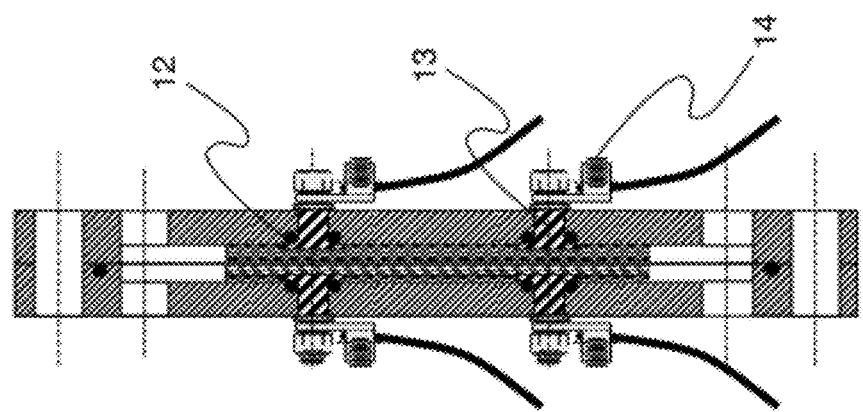
FIG. 1c shows a side elevation view of a partially assembled electrolyzer cell, showing FIG. 1a and FIG. 1b assembled face-to-face.

FIG. 1c shows a side elevation view of a partially assembled electrolyzer cell, showing FIG. 1a and FIG. 1b assembled face-to-face. Assembly of the electrolyzer cell begins with both the hydrogen and oxygen half-cells (1) and (2). O-ring static seals (12) are placed over the contact buttons (13) and the resultant 24 subassemblies are pressed into the close-tolerance holes equally spaced over both the hydrogen half-cell (1) and the oxygen half-cell (2). The tolerance is such that the installed free height of the uncompressed O-ring assemblies causes the outside faces of the contact buttons (13) to be ~0.030" to 0.045" below the back face of the half-cell. Future attachment to either external wiring lugs and/or inline connection plugs will cause this gap to be taken up due to tightening, and the O-rings will then be squeezed to their desired 25 to 30% static compression, thereby allow sealing the cell at pressures up to 200 bar. Thereafter, the hydrogen half-cell is prepared for final assembly. The precision plastic spacers (3a) and (3b) are located as shown. The first spacer screen (7) is located using the raised surface features of the plastic spacer elements to effect alignment. The 6.00"×18.00" Ni-200 hydrogen electrode (4) and two additional spacer screens are similarly positioned in the stack. The main static seal face O-ring (11) for rendering the cell assembly leak tight is then pressed into the O-ring groove. The GSM "picture frame" (6) is then placed into the hydrogen half-cell (1) relief features, to complete the hydrogen half-cell (1) preassembly.

Assembly of the remaining oxygen half cell (2) continues with two spacer screens (7) placed atop the GSM "picture frame" (6), along with the set of four precision plastic inserts (3a), to facilitate alignment. The 6.00"×18.00" CRES SS-316L oxygen electrode (5) is then placed onto the stack along with the third spacer screen (7). The oxygen half-cell (2) is then centered over the mating portion of the hydrogen half-cell (1) and the two halves brought together and temporarily clamped for the next assembly step.

The hydrogen cathode (4) is manufactured of CRES Ni-200 30×30 mesh with 0.38 mm wire diameter screen and the oxygen anode (5) is manufactured of CRES SS-316L 30×30 mesh with 0.38 mm wire diameter screen. These electrode screen materials offer a very highly effective wetted surface area (at ~2.828× the projected surface "active area"). The employment of dual ~0.032 inch thick polypropylene separator screens (7), similar to InterNet Inc. type ON-3350, provides the required features for establishing a desired flow annulus (W×H) and path length ($L_p$) geometry between that of the hydrogen and oxygen electrodes (4 & 5) and the Gas Separation Membrane (GSM) "picture frame" (6) and, by means of a single separator screen (7) between each faceplate and its respective electrode, allows the evolution of gas bubbles from both sides of either the hydrogen or oxygen electrode surfaces. These elements promote optimal flow path geometry, suited to the establishment of a uniform laminar "sheet flow" volume within the gaps separating the electrode surfaces from the GSM "picture frame" (6). The preferred GSM "picture frame" (6) is a very low cost microporous material similar to Sifer Nitex 3-1/1 (699/470 mesh; 37 thread diameter; 75 μm thick Polyamide), treated with a hydrophobic wet chemical surfactant, which is mounted into a "picture frame" (6) using DuPont Elvax Ethylene-Vinyl-Acetate thermal laminate or similar material with ~1 mm overlapping thickness.

Test results of a ~$\frac{1}{4}^{th}$ scale prototype assembly indicate capability for a preferred size 108 in$^2$ active area electrolyzer cell to provide up to 306 amps at 70 degrees F. when operating at a cell potential of 2.18 VDC (~68% thermo-neutral efficiency) or up to 430 amps at 130 degrees F. when operating at the same potential voltage. This configuration will also provide up to 92 amps at 70 degrees F. operating at a cell potential of 1.83 VDC (81% thermo-neutral efficiency) or up to 165.6 amps at 130 degrees F. when operating at the same potential voltage.

The laminar flow forced recirculation means is provided from a low static head delivery pump (~6.0 GPM @ 6 ft. TDH or ~2.7 Psig), a 12 VDC Rule Model 20R bilge pump operating at ~16 Watts, to amplify low volume passive "bubble-lift" recirculation flow to much larger levels than heretofore possible by the employment of only "bubble-lift" induced flow. The measured performance improvement using this laminar flow forced recirculation technique demonstrated the capability to provide up to 600% higher current than possible with passive "bubble-lift" performance at an applied voltage of 1.83 VDC, up to 500% higher current at an applied voltage of 1.90 VDC and up to 350% higher current at an applied voltage of 2.18 VDC. This nonlinear performance characteristic is achieved with the consumption of ~3.5% of the power used by the electrolyzer cell itself.

FIG. 1d is an enlarged, spaced apart view of a portion of the electrode assembly shown in FIG. 1c that shows a stack-up of separator plates 7 comprised of single thickness plates 7a and 7d adjacent the back side of the hydrogen electrode 4 and oxygen electrode 5, next to the respective outer fiberglass plates 1 and 2, respectively. Sandwiching the GSM 6 are separator plates 7b and 7c which may each be two individual single thickness screens or individual double thickness screens of separator screen 7.

FIG. 2 depicts a front elevation view of the assembled single cell configuration, showing tie rod fasteners (15), single width reinforcement bars (16) and triple width manifold/reinforcement bars (17 & 18). These assemblies provide a dual function by stiffening the outermost half-cell portions against internal pressures of up to 200 bar and providing O-ring face seal features and manifolded ¾-16 SAE O-ring ports for adaptation to the external high pressure piping system for the remainder of the electrolyzer assembly.

FIG. 3 shows a side elevation section of the assembled electrolyzer cell with the manifolded/reinforcing bars (16, 17 & 18). Item (17) is located two places, as depicted on FIG. 2, on the hydrogen side of the cell, with item (18) located on the oxygen side of the cell.

Accordingly, additional features include the capability to operate at varying delivery pressures up to 200 bar (~3,000 Psig) and stiffener plates (16, 17 & 18) which offer the strength of steel with the weight of aluminum. A multiplicity of individual Shapal-M single-width ceramic stiffener plates (16) and triple-width manifold stiffener plates (17 & 18) are employed to bridge the respective faceplates of the cell from the upper to the lower sets of tie rods, in order to keep face plate deflections at or below 0.003 inches at a maximum operating pressures of 200 bar. These strengthening elements allow operation at 200 bar a minimal 24# increased weight per cell.

FIG. 4 illustrates connection of a group of six or more cells into a larger module, by replacement of the individual tie rods (15) with extended tie rods (19). Connectivity between the respective cells is achieved by the installation of 12 each spanner tubes (21) connecting opposed sets of banana jack connectors.

Finally, the cells are easily plugged together to form multi-cell stacks (FIG. 4). This creates a multiplicity of parallel conductive feed paths (12, 13 & 14) for external wiring, and (20 & 21) for cell-to-cell connections. Thus, wiring line losses from the power supply to the cells and between the series-wired interconnection points are minimized. This configuration, consisting of up to 12 parallel conductive paths, reduces contact voltage drop losses between the respective cells and keeps total resistive losses below 1%. Employment of 12 discrete conductive paths, the current through any discrete conductive element is kept below 21 amps/element, and allows capability to produce up to a rated 4.00 SCFH of hydrogen and 2.00 SCFH of oxygen when operated at a nominal applied voltage of 1.95 VDC per cell (or 78% thermo-neutral efficiency) and at a current of 250 amps at an equilibrium temperature of ~130 Deg. F.

The use of a single-cell 108-in$^2$ active area flat-panel configuration capable of providing $H_2$ and $O_2$ at delivery pressures up to 200 bar, provides a "building-block" cell configuration which can be connected in series into modules of six or more cells (FIG. 4). The effective active area is 2.828× larger than the projected surface area due to the very large wetted surface area provided by the screen material, yielding an effective active area of ~2,000 cm$^2$. The effective current density is therefore 250 amps/2,000 cm$^2$, or 0.125 amps/cm$^2$, allowing for a ~11.2 year endurance life operating continuously 24/7 before reaching a 50% electrode corrosion point, or a >22.5-year life operating at a 50% duty cycle. By way of example, a Ni-200 electrode for the hydrogen cathode (1) will exhibit a corrosive attack rate of <0.017 mm per year in a 40% KOH solution, at an apparent current density of ~0.35 amps/cm$^2$/2.828× surface area multiplier, as referenced to the 30×30 mesh Ni-200 wire screen electrode with 0.381 mm diameter wire size, or an effective current density of ~0.125 amps/cm$^2$ and operating temperature of 130 degrees F. The oxygen anode (2) corrosion rate is ~10× smaller than the hydrogen cathode and is considerably less susceptible to corrosive attack.

The GSM "picture frame" (6), located between the hydrogen cathode (1) and oxygen anode (2), facilitates ease of ionic exchange and serves to inhibit any crossover of $H_2$ and $O_2$ bubbles from one electrode area to the other. During the initial nucleation up to lift-off diameter, occurring along all of the wetted wire surfaces of the respective wire screen electrodes (4 & 5), a virtual "cloud" of $H_2$ bubbles, ~0.012 mm in diameter, begins streaming from the electrode wire surfaces at free stream velocities of ~1 mm/sec. adjacent to the electrode surface. These bubbles could potentially grow to 10× in size at free stream velocities of 10 mm/sec. as they transition the boundary layer to enter the fully-developed flow regime of the forced recirculation flow path at ~10 cm/sec. The Stokes Law relationship for bubble size as a function of velocity is:

Average Velocity=Dia.$^2$×g, gravitational constant/(12× Kinematic Viscosity)

The pore size of the Sifer Nitex 3-1/1 is 1 μm or ~12× smaller for the initial condition. As the pressure is increased to 200 bar, the density of the $H_2$ and $O_2$ bubbles increases proportionately, necessitating larger bubble volumes to provide the requisite initial lift to overcome surface tension effects, or ~6× larger in bubble size. It is therefore evident that crossover of $H_2$ and $O_2$ bubbles at operating pressures of 200 bar is even less likely as the operating pressure increases.

Figure 5:
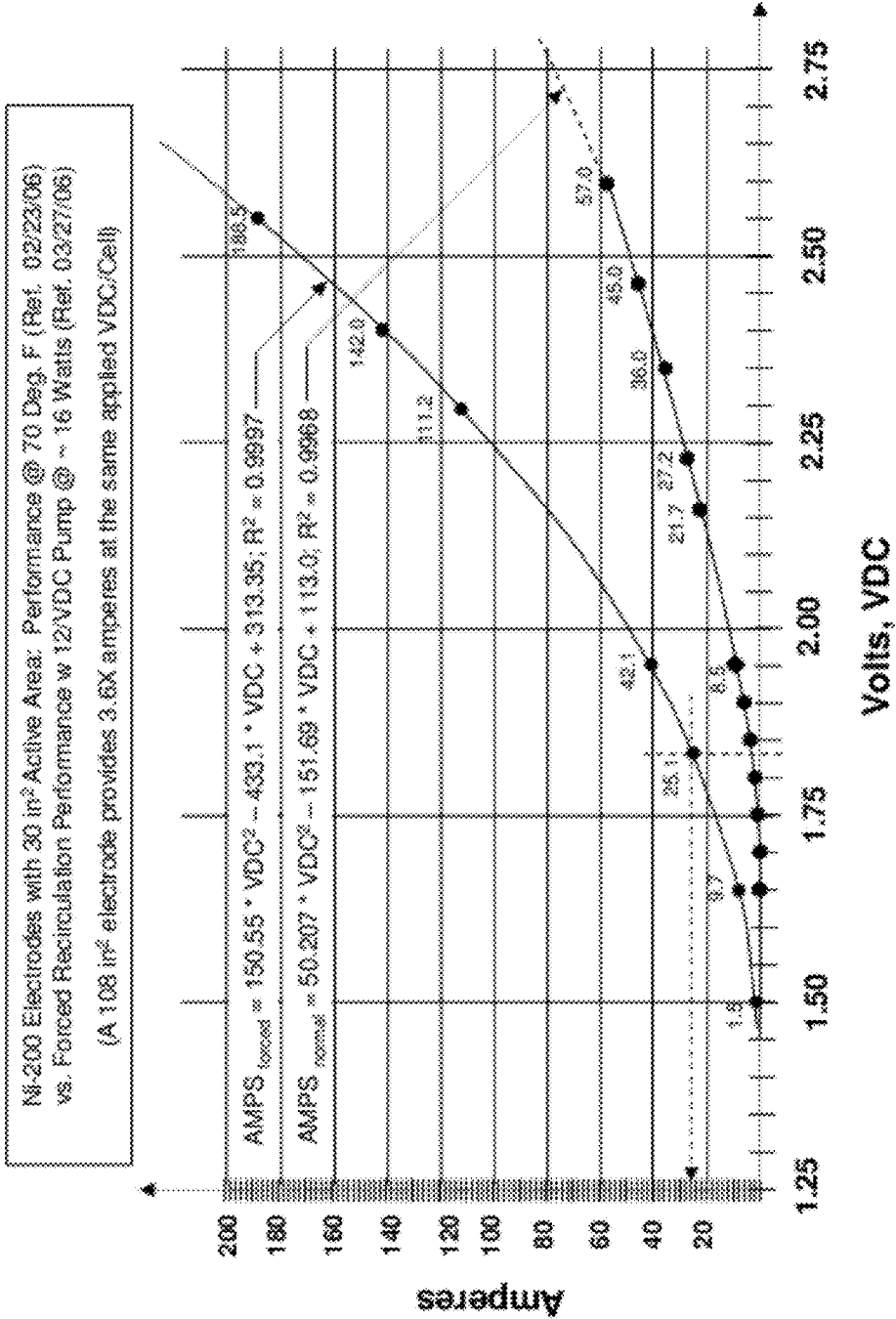
FIG. 5 provides test data on a 0.28× scale single cell electrolyzer configuration.

FIG. 5 provides test data on a 0.28× scale single cell electrolyzer configuration. The test data are summarized for both normal mode (no forced recirculation) and forced mode (with forced recirculation), using a 12 VDC recirculation pump consuming ~16 watts and demonstrating ~500% performance boost versus the use of passive "bubble lift" recirculation.

Figure 6:
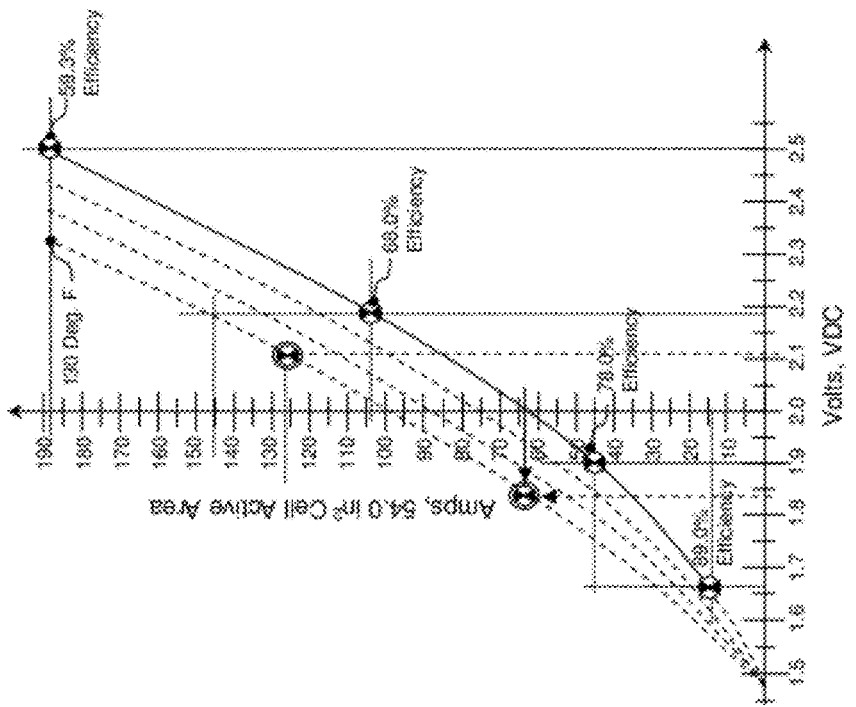
FIG. 6 provides the test results of a nominal 54-in² electrolyzer cell without forced recirculation, demonstrating both overall efficiency, versus applied voltage, and efficiency with change in operating temperature.

FIG. 6 provides the test results of a nominal 54-in$^2$ electrolyzer cell without forced recirculation, demonstrating both overall efficiency, versus applied voltage, and efficiency with change in operating temperature. Scalability is achieved in direct proportion to the size of the electrolyzer active area; a 2× increase in active area leads to a 2× increase in the achievable current at the same applied voltage. Hydrogen production occurs at the rate of 1 SCFH per 63.2 amperes of current (per Faraday's Law) and oxygen production is 50% that of hydrogen production.

Figure 7:
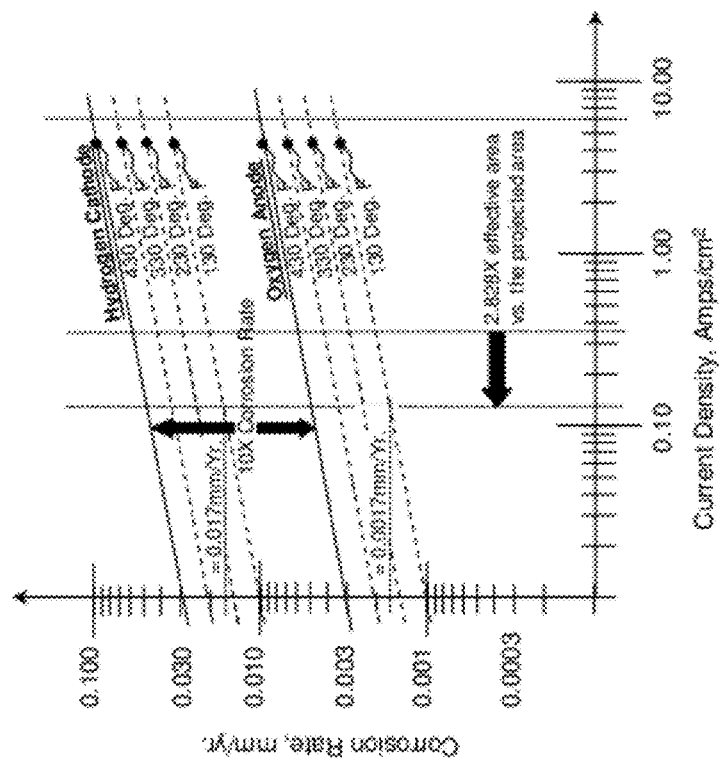
FIG. 7 illustrates the expected endurance lifetime for the electrolyzer cell assembly operation at ~130 degrees F.

FIG. 7 illustrates the expected endurance lifetime for the electrolyzer cell assembly operation at ~130 degrees F. The diagram shows that the expected lifetime will be at least 11.2 years (or ~22.5 years operating on a 50% duty cycle) before corrosion degrades the electrode mass to ~50%, or 0.017 mm/year acting on the 30 mesh 0.382 mm diameter wire size electrode screen material.

In conjunction with the selection of materials employed to assemble the cell, the configuration disclosed herein allows for greatly reduced cost per kg of hydrogen gas produced. This cell configuration lends itself to the achievement of high efficiency by establishing a much higher apparent electrode surface area (2.828×) than the actual physical surface area. Gas bubbles are removed from their surface nucleation sites more quickly under forced recirculation, greatly reducing the masking effects for the electrolysis process, and thereby allowing larger volumes of gasses to be generated using a significantly smaller electrode area. Cost saving are directly proportional to the electrolyzer size. Further savings are realized by the low effective current density and operating temperatures, which allow an extended endurance lifetime capability of 11.2 years operating 24/7 due to reduced corrosive attack potential. Additionally, two or more cells (preferably up to six) may be connected in series (FIG. 4), in order to adapt to existing COTS low voltage power supplies suited to being powered by single phase AC circuits, such as those found in residences. Assembly into larger series/parallel arrays is also possible and could accommodate a variety of multiphase high voltage/high current power sources, such as those found in industrial or utility applications. Finally, capability to operate at high pressures up to 200 bar yields capability to eliminate the need for an external gas compressor.

The design prevents gas crossover from occurring through the GSM. The active area of the cell is fully submerged in electrolyte, and nucleated bubbles of gas separate from their respective electrode surfaces, rising quickly (at rates above 10 cm/sec.) to the collection manifold ports (17 & 18) on either side of the separation media. The GSM employs a "picture frame" (6) of DuPont Elvax Ethylene-Vinyl-Acetate thermal laminate with ~1 mm overlap, to completely seal off all exposed GSM surfaces areas outside of the electrode assembly surface area, offering the additional advantage of strengthening the GSM. Finished die-cut dimensioning assures a close tolerance fit into the respective relief features located on each half of the electrolyzer cell.

The process of nucleation, separation and bubble transport (from buoyant forces acting on the respective gas bubbles) results in osmotic drag of the KOH electrolyte fluid, creating a low level of passive recirculation. This process is greatly accelerated by the use of the forced recirculation pumps to yield a net reduction in effective cell resistance of up to 500% at high current density, due to the scrubbing effect of the forced electrolyte flow knocking the bubbles off the electrode. The separated gas streams are directed out of the individual cells halves (1 & 2) through flooded lines into their respective hydrogen and oxygen gas separator assemblies. Further conditioning of the gasses to remove KOH, separation of the residual gasses (% of $H_2$ in the $O_2$ stream or $O_2$ in the $H_2$ stream) and water separation/return are downstream of the primary separators and integrated into the system, as dictated by the intended end use for levels of required purity.

Low cost/long life (corrosion-resistant) materials are employed to minimize component element costs for the respective electrodes (4 and 5), cell halves (1 and 2), and separator screens (7). This is especially true when considering the use of Sifer Nitex 3-1/1 or similarly material at ~1¢/cm$^2$ versus prior art designs using PEM membranes at ~$1.00/cm². The total estimated cost for six cells (FIG. 4), including assembly labor, external Balance-of-Plant and associated dual 12 VDC, 250 amp capacity power supplies, is below ~$4,500. Manufacturing cost projections, based upon a 90% Crawford Learning Curve, and assuming an initial unit cost of $6,000 (this includes the 33% manufacturing margin) yield a cumulative average cost of $4,800/unit for the first ten, $3,500/unit for the first 100, $2,500/unit for the first 1000 units, and ~$1,000 for the first 500,000 units. (DOE uses a quantity of 500,000 units as the cost-estimating basis for meeting hydrogen production goals, which are presently pegged at <$2.50/kg for 2012).

Over the course of a minimum electrode lifetime of 20 years (when operated @ 50% duty cycle), and taking advantage of nighttime power costs of ~1.5¢/kWh, the 6-cell stack would produce 24 SCFH/hour×12 hours/day×365 days/year× 20 years, or ~2.10×10⁶ SCF of $H_2$, or ~5,155 kg. The capital cost would therefore amount to ~$0.194/kg and the electrical power consumption costs would be $0.015/kWh×3 kWh/hour×12 hours×365 days/year×20 years, or $3,942/5,155 kg or $0.764/kg, or a net cost of ~$0.96/kg. This value is 2.6× below that of the DOE 2012 goal for hydrogen production, and indicates that even doubling the capital cost basis of the electrolyzer stack would only add an additional $0.194/kg to the net cost or ~$1.15/kg. Even with the use of renewable energy sources (i.e., at 4.5¢/kWh) to replace the use of low cost nighttime electric power at 1.5¢/kWh, it will be possible to meet the DOE 2012 goal for $H_2$ production at <$2.50/kg.

We claim:

1. An electrolyzer device comprising:
   a plurality of cells, each of the cells including:
      a hydrogen half cell;
      an oxygen half cell;
      a GSM (Gas Separation Membrane);
      two inner hydrogen half cell spacer screens;
      an outer hydrogen half cell spacer screen;
      a hydrogen electrode;
      two inner oxygen half cell spacer screens;
      an outer oxygen half cell spacer screen; and
      an oxygen electrode,
      wherein the hydrogen half cell includes the hydrogen electrode which is located between said two inner hydrogen half cell spacer screens and said outer hydrogen half cell spacer screen,
      wherein the oxygen half cell includes the oxygen electrode which is located between said two inner oxygen half cell spacer screens and said outer oxygen half cell spacer screen,
      wherein the GSM is provided between said two inner hydrogen half cell spacer screens of the hydrogen half cell and said two inner oxygen half cell spacer screens of the oxygen half cell, and
   wherein the plurality of cells are connected in series.

2. The electrolyzer device of claim 1, wherein, in one or more of the cells, the gas separation membrane is made of micro-porous material providing 1 µm pore size and 1 µm open area.

3. The electrolyzer device of claim 1, wherein, in one or more of the cells, the gas separation membrane is made of a porous woven mesh of polyamide.

4. The electrolyzer device of claim 1, wherein the cells are joined together by one or more tie rods.

5. The electrolyzer device of claim 1, wherein the cells are electrically connected in series by a plurality of wiring.

6. The electrolyzer device of claim 1, wherein one or more first ports are disposed in each of the cells.

7. The electrolyzer device of claim 6, one or more second ports are disposed below the one or more first ports in each of the cells.

* * * * *